(12) United States Patent
Adams et al.

(10) Patent No.: US 10,717,380 B2
(45) Date of Patent: Jul. 21, 2020

(54) CONVERTIBLE TRAILER FOR PACKAGED GOODS AND DRY BULK MATERIAL

(71) Applicants: Scott Adams, Webster, TX (US); Alfie Young Bingham, III, LaGrange, IL (US)

(72) Inventors: Scott Adams, Webster, TX (US); Alfie Young Bingham, III, LaGrange, IL (US)

(73) Assignee: Bulkmatic Transport Company, Griffith, IN (US)

( * ) Notice: Subject to any disclaimer, the term of this patent is extended or adjusted under 35 U.S.C. 154(b) by 216 days.

(21) Appl. No.: 15/825,307

(22) Filed: Nov. 29, 2017

(65) Prior Publication Data

US 2018/0147973 A1    May 31, 2018

Related U.S. Application Data

(60) Provisional application No. 62/427,254, filed on Nov. 29, 2016.

(51) Int. Cl.
*B60P 3/42* (2006.01)
*B62D 53/06* (2006.01)

(52) U.S. Cl.
CPC ............ *B60P 3/426* (2013.01); *B62D 53/067* (2013.01)

(58) Field of Classification Search
CPC ........... B60P 3/426; B60P 3/42; B62D 53/067
See application file for complete search history.

(56) References Cited

U.S. PATENT DOCUMENTS

| 2,712,797 | A | * | 7/1955 | Woehrle | B60P 3/426 |
| | | | | | 296/39.1 |
| 3,087,759 | A | | 4/1963 | Worster | |
| 3,578,213 | A | * | 5/1971 | Clarke | B65D 90/047 |
| | | | | | 222/95 |
| 3,595,175 | A | | 7/1971 | Austill | |
| 3,756,469 | A | * | 9/1973 | Clark | B60P 3/42 |
| | | | | | 222/105 |
| 4,092,044 | A | * | 5/1978 | Hoffman | B62D 53/067 |
| | | | | | 105/243 |
| 4,092,051 | A | | 5/1978 | D'Orazio | |
| 4,101,158 | A | | 7/1978 | Jones | |
| 4,281,870 | A | * | 8/1981 | Ehrlich | B61D 3/02 |
| | | | | | 105/372 |
| 4,557,400 | A | | 12/1985 | Clarke | |
| 5,690,466 | A | * | 11/1997 | Gaddis | B60P 1/40 |
| | | | | | 296/184.1 |
| 8,100,614 | B2 | * | 1/2012 | Jerich | B60P 3/426 |
| | | | | | 410/2 |

OTHER PUBLICATIONS

International Search Report and Written Opinion for PCT/US2017/063684, dated Mar. 13, 2018.

* cited by examiner

*Primary Examiner* — James Keenan
(74) *Attorney, Agent, or Firm* — Vedder Price P.C.

(57) ABSTRACT

A simple and lightweight solution that provides shippers of dry bulk material an apparatus that facilitates the efficiencies of backhaul pricing in the form of a trailer that is convertible from a configuration used with dry bulk material in an efficient manner (i.e., sealed to outside exposure, food safe, easily cleaned, etc.) to a configuration used with packaged goods as efficiently as a standard van trailer (i.e., must allow forklifts to load palletized and packaged goods for conventional loading and unloading at conventional warehouses with conventional loading docks).

5 Claims, 13 Drawing Sheets

CONVERTIBLE TRAILER FOR PACKAGED GOODS AND DRY BULK MATERIAL

CROSS-REFERENCE TO RELATED APPLICATION

The present utility patent application claims priority from and the benefit of U.S. Provisional Patent Application No. 62/427,254, filed Nov. 29, 2016, entitled CONVERTIBLE TRAILER FOR PACKAGED GOODS AND DRY BULK MATERIAL, the contents of which is hereby incorporated by reference in its entirety.

FIELD OF THE DISCLOSURE

This disclosure relates to an apparatus that can be configured to haul either packaged goods or dry bulk material, but not at the same time. More particularly, this disclosure relates to an apparatus, such as a semi-articulated trailer that may be (a) loaded and unloaded by forklifts through a rear opening with packaged goods (i.e., any item or items that are disposed within a box, container, or other similar discrete packaging of any kind, shape or configuration (including item or items disposed on a pallet and wrapped with plastic wrap sheathing such as pallet stretch wrap or the like) that may be on pallets or similar common support, rather than such item or items in bulk without any box, container or similar discrete packaging of any kind), and (b) loaded with dry bulk material through dome lids in a roof of the trailer and unloaded by tilting the trailer so that the dry bulk materials moves into a discharge assembly.

BACKGROUND

There is no conventional trailer-type of apparatus that can provide the desired functionality of hauling both packaged goods and dry bulk material. There are known trailers that are configured to efficiently haul dry bulk material and there are other known trailers that are configured to efficiently haul packaged goods.

Conventionally, dry bulk material, such as granular chemicals or plastics, polymers, agricultural products, mineral commodities, food grade commodities like flour, sugar, starch, coffee, and grains, etc., are moved in bulk form (i.e., large quantities without any box, container or similar discrete packaging) from a manufacturing facility or a distribution center to an end user by a trailer that has been manufactured specifically for such dry bulk materials, such as a conventional pressure vessel trailer as illustrated in FIG. 1.

Other novel apparatus that provide simple and lightweight solution to facilitate the storage, transport and delivery of dry bulk materials that are cost-effective, standardized and overcome the disadvantages of the complex and costly prior art systems have been developed.

One of skill in the art will recognize that conventional dry bulk material storage, transport and delivery apparatus and technology is highly specialized, uniquely configured for its intended functionality, and does not additionally facilitate the loading and unloading of packaged goods, which is usually performed by forklifts or hand trucks for pallets of packaged goods, in the same trailer. Obviously, conventional dry bulk material trailers are closed on each end. The dry bulk material is loaded through the ports at the top of the cylindrical vessel and unloaded through the ports at the bottom of the cylindrical vessel.

Dump truck type of technology is also well established for storage, transport and delivery of dry bulk material. However, dump trucks are not configured to store, transport and delivery dry bulk material without exposure to the elements, since the top is open and the open top specifically enables the functionality of the dump bed. Additionally, dump trucks are also not configured or enabled to accommodate forklifts or pallets of packaged goods. Consequently, dump trucks are not designed to haul packaged goods and, as another disadvantage, do not meet food shippers' sanitation standards because of difficulties sealing out environmental exposure.

Another established system for the storage, transport and delivery of dry bulk material includes tilting technology and liners in connection with standardized intermodal containers. For example, a 20, 30, or 40 foot intermodal container has a liner installed (which is basically a very large plastic bag), that is filled with the dry bulk material, and then shipped by truck, rail or boat. In order to deliver this intermodal container filled with dry bulk material, a specialized chassis (rather than a standard intermodal chassis) with a lift piston is necessary to tip the intermodal container to an angle allowing the dry bulk material to move to the rear (or back that is remote from the tractor, which upon tipping or lifting, becomes the lower point) of the intermodal container, where the dry bulk material is discharged by gravity generally through wide open doors of the container if appropriately fitted, into a device like a rotary valve airlock which feeds the dry bulk material into pneumatic conveyance. Unfortunately, bulk intermodal containers with liners have two major problems: high tare weights (the containers themselves are quite heavy with respect to the payload weight they can carry and a separate chassis that must be structurally sound on its own, which results in lower net weights), and the requirement for installation and disposal of very large liners.

Additionally, over long distances, the cost efficiencies of shipping and receiving product in bulk can be offset by the cost inefficiencies of returning the trailer to origin empty. On longer routes, truckload pricing is often predicated on backhauls or two-way loaded moves generating revenue in each direction. Shipping in bulk offers certain efficiencies over handling packaged goods, but usually not enough to overcome the constraint of generating revenue on only the outbound leg.

Critically, dry bulk material, particularly food for human consumption, cannot be exposed to foreign contaminants. Regulators, shippers, manufacturers, consumers, etc. of dry bulk material (or end products based upon or including dry bulk material) don't want metal shavings, glass, wood splinters, paper, plastic wrap, mud, grease, oil, rubber skid marks, contaminants, etc. coming into contact with the dry bulk materials (or the end product based upon or including dry bulk material). Consequently, any vessel handling both bulk and non-bulk needs to keep the unpackaged bulk material free from adulteration or contamination.

Therefore, there is a need in the art for a simple and lightweight solution that provides shippers of dry bulk material and packaged goods an apparatus that facilitates the efficiencies of backhaul pricing in the form of a trailer that is convertible from a configuration used with dry bulk material in an efficient manner (i.e., sealed to outside exposure, food safe, easily cleaned, etc.) to a configuration used with packaged goods as efficiently as a standard van trailer (i.e., must allow forklifts to load palletized and packaged goods for conventional loading and unloading at conventional warehouses with conventional loading docks) and that overcomes the disadvantages of the prior art apparatus.

This disclosure consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENTS

Figure 1:
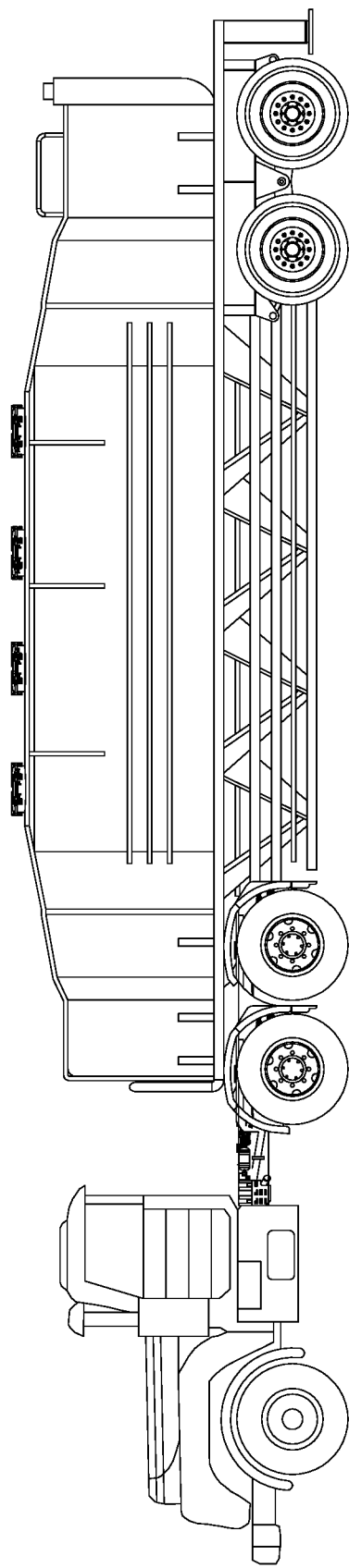
FIG. 1 illustrates a conventional dry bulk material trailer.

The following disclosure as a whole may be best understood by reference to the provided detailed description when read in conjunction with the accompanying drawings, drawing description, abstract, background, field of the disclosure, and associated headings. Identical reference numerals when found on different figures identify the same elements or a functionally equivalent element. The elements listed in the abstract are not referenced but nevertheless refer by association to the elements of the detailed description and associated disclosure.

Generally, the embodiments of the apparatus described in this disclosure are directed to a convertible trailer that is configured to handle dry bulk materials as efficiently and safely as a dedicated, specialized dry bulk material trailer (i.e., sealed to outside exposure, food safe, relatively lightweight, easily cleaned, doesn't require liners, but liners can be adapted if required, desired, etc.) and to handle packaged goods as efficiently as a standard van trailer. As a result, bulk shippers can continue to efficiently ship dry bulk materials and achieve the efficiencies of backhaul pricing, most commonly for packaged goods.

Preferably, the trailer can be lifted to "dump" the dry bulk material, but the lifting mechanism for this trailer would not be incorporated on the trailer or tow vehicle. Rather, it would be an external apparatus installed, used or available at delivery point. Consequently, the trailer will be significantly lighter than a container on a "tilt chassis", allowing shippers to ship higher payloads legally, safely and economically.

The embodiments of the trailer of this disclosure are not designed for intermodal shipping containers, but rather is a specialized multi-function trailer that is not intended for rail or marine transport, and is not designed to be stacked or lifted by cranes. In a marked departure from intermodal container technology, the trailer of the present disclosure eliminates the need or requirement for a "liner" (but affords the alternate option to use a liner if required by or desired for the bulk material product) as well as the need for a heavy mechanical lifting mechanism, usually hydraulic piston, to be attached to the road transport unit (similar to the dump truck technology differentiated herein). Accordingly, if the liner can be eliminated, then cost and waste are reduced. Likewise, with respect to lifting mechanisms.

Preferably, the trailer assembly 100, unlike a dump truck, is designed to allow forklifts to load palletized and packaged goods into a fully covered box shaped van for conventional loading and unloading at conventional warehouses with conventional loading docks.

Figure 2:
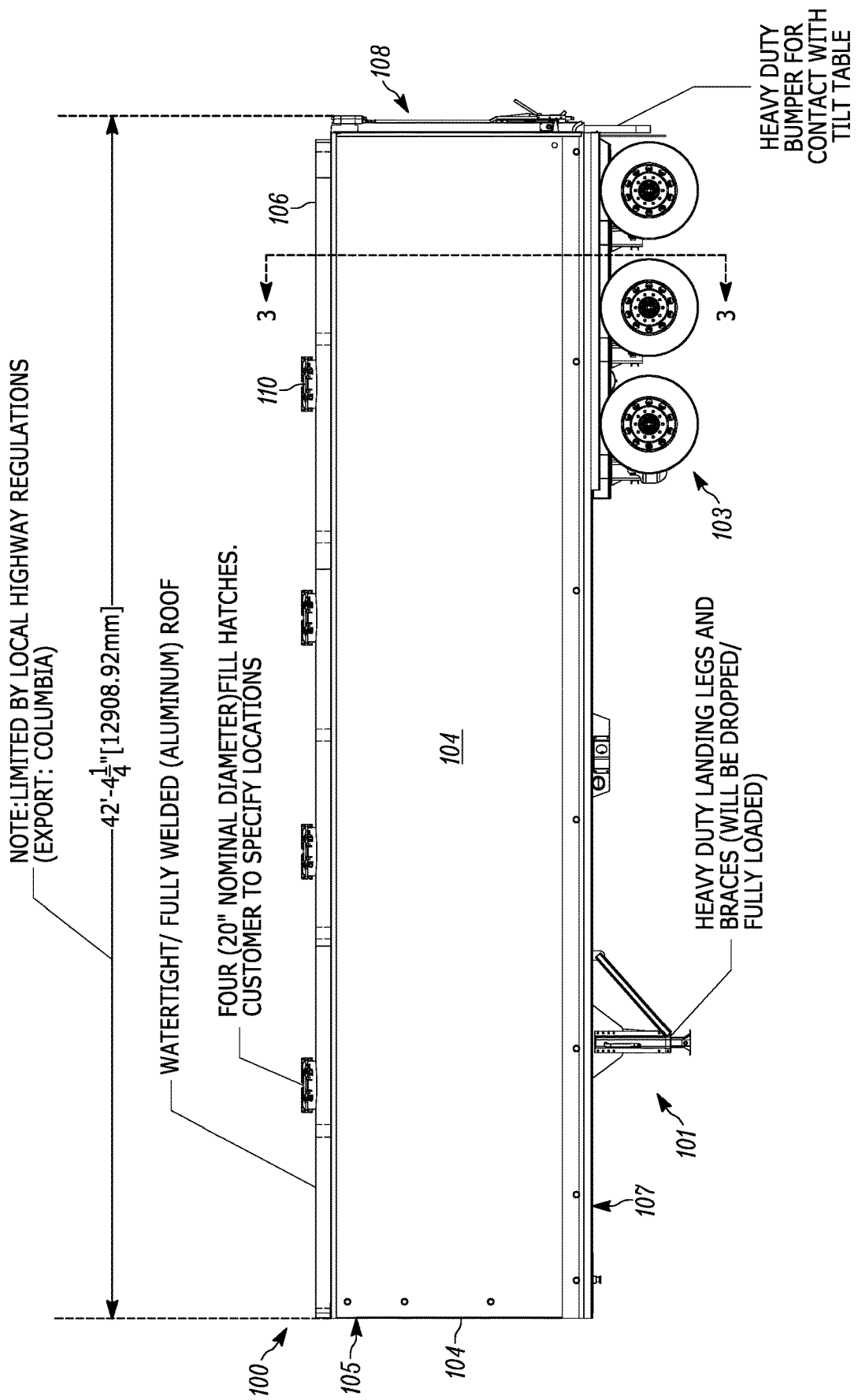
FIG. 2 illustrates a side elevation view of one embodiment of a convertible trailer of the present disclosure.

FIG. 2 illustrates a side elevation view of one embodiment of a convertible trailer assembly 100 of the present disclosure that is configured to have outside dimensions that comply with applicable local laws, rules and regulations. The embodiment of FIG. 2 illustrates what is conventionally referred to as a 42' trailer, but the teachings of the present disclosure may be applied equally to a standard over-the-road semi- or dry van trailer having dimensions that comply with applicable local laws, rules and regulations. Generally, the convertible trailer assembly 100 may include a chassis having a base 107 from which landing gear 101 extends and to which a ground engaging wheel and tire assembly 103 is connected and a van body, trailer, container, enclosure or the like 105 surmounted to the base, as described in more detail herein.

One of skill in the art will recognize that the trailer 100 of the present disclosure appears substantially the same as a standard over-the-road semi- or dry van trailer, as commonly known or referred to, rather than the conventional bulk material trailer illustrated in FIG. 1. However, there are some externally noticeable differences as a result of the developments herein. For example, at least one and preferably a plurality of fill hatches 110 are added to the roof 106 of the convertible trailer 10 of the present disclosure to facilitate loading of bulk materials, similar to the functionality provided by the standard bulk materials trailer shown in FIG. 1. Generally, the fill hatches 110 may have a conventional 20" nominal diameter, but may also be configured to fulfill the needs or purposes of a custom application, as desired. Likewise, spacing between the fill hatches 110 is as desired to facilitate the intended functionality, such as consistent, inconsistent, variable and arbitrary spacing.

Figure 2A:
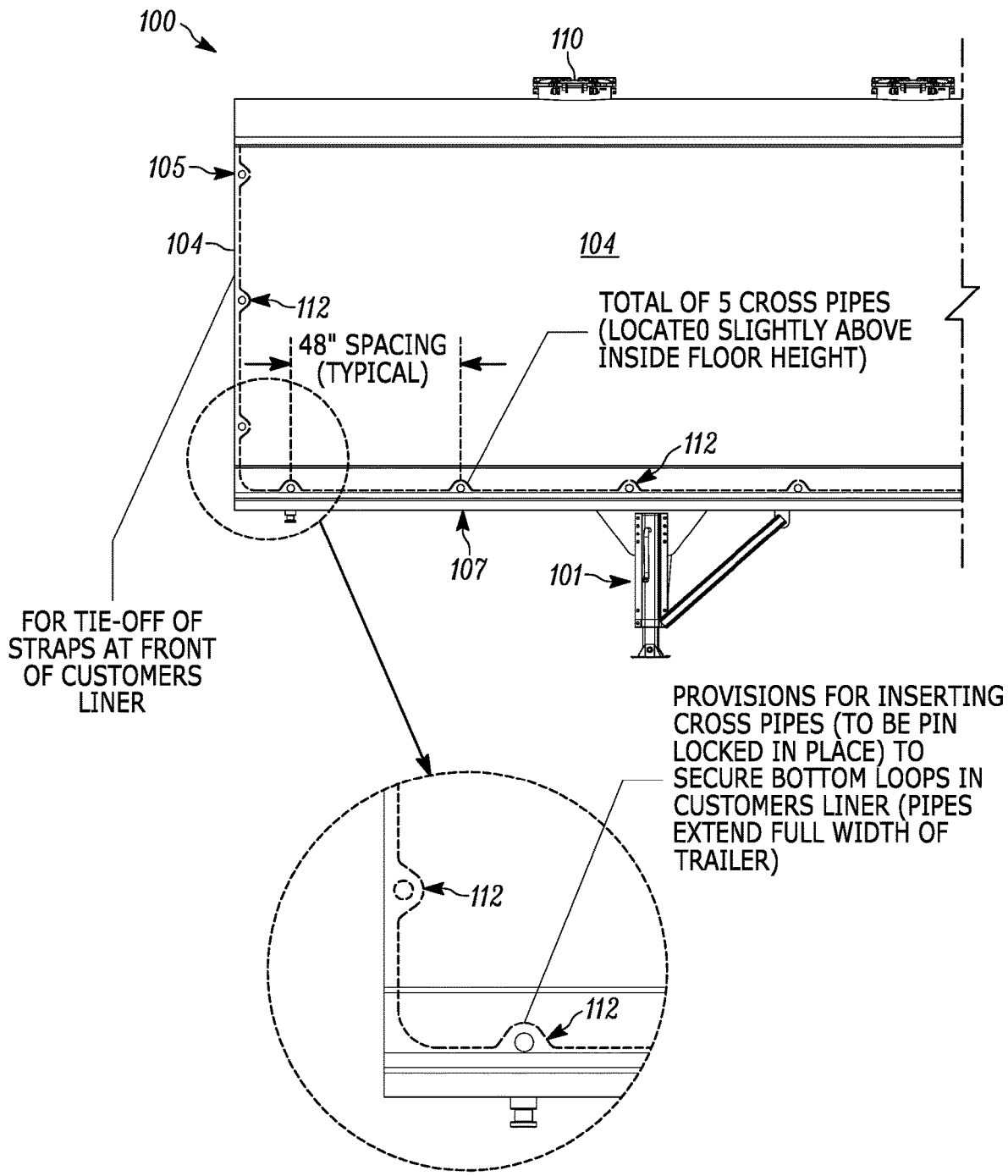
FIG. 2A illustrates a side partial cut away and partial detail view of one embodiment of a convertible trailer of the present disclosure.

FIG. 2A illustrates a side partial cut away and partial detail view of one embodiment of a convertible trailer 100 of the present disclosure. In this embodiment, structure 112 is provided to facilitate connection of a liner (not shown for the sake of clarity but commonly understood by one of ordinary skill in the art) to the interior of the convertible trailer, if required by the shipper of the dry bulk material. The structure 112 may be configured in any acceptable form to facilitate the intended functionality, such as holes, apertures, loops, rings, etc. formed in a sheet material that is connected to or formed in the side or end walls of the convertible trailer to provide a secure connection for the liner directly or indirectly, such as by cross pipes, pins, rods, or the like, etc. One of skill in the art will recognize that other structure that provides the same or similar intended functionality may also be used.

Additionally, enhanced, stronger, heavy duty landing legs and braces 101 have been incorporated to facilitate reliability as a result of the additional capacity and corresponding weight that the convertible trailer 100 of the present disclosure may accommodate due to its increased volume over the conventional bulk material trailer illustrated in FIG. 1. For example, the capacity of the convertible trailer 100 of the present disclosure (in a 42' configuration) may be approximately 2,944 cubic feet of maximum bulk material that can be loaded (i.e., shell full), as opposed to a comparable (i.e., 42' length) standard pneumatic trailer that may only haul 2070 cubic feet of bulk materials. Further, an additional axle may be incorporated to aid in the load carrying capacity and a heavy duty bumper may be added to accommodate contact with a tilt table (as described below) and protect the trailer from damage.

An example of the capacity of one embodiment of the convertible trailer 100 is set forth in Table A below (compared to a conventional pneumatic trailer of the same length):

TABLE A

|  | Subject Application Embodiment (42') | Conventional Pneumatic (42') |
| --- | --- | --- |
| Payload | 77,000 lbs. | 66,000 lbs. |
| Trailer | 15,200 lbs. | 11,600 lbs. |
| Liner | 86 lbs. (optional) | Not applicable |
| Tractor | 17,000 lbs. (estimated | 17,000 lbs. (estimated |
| Total Gross | 109,286 lbs. | 94,600 lbs. |

Figure 3:
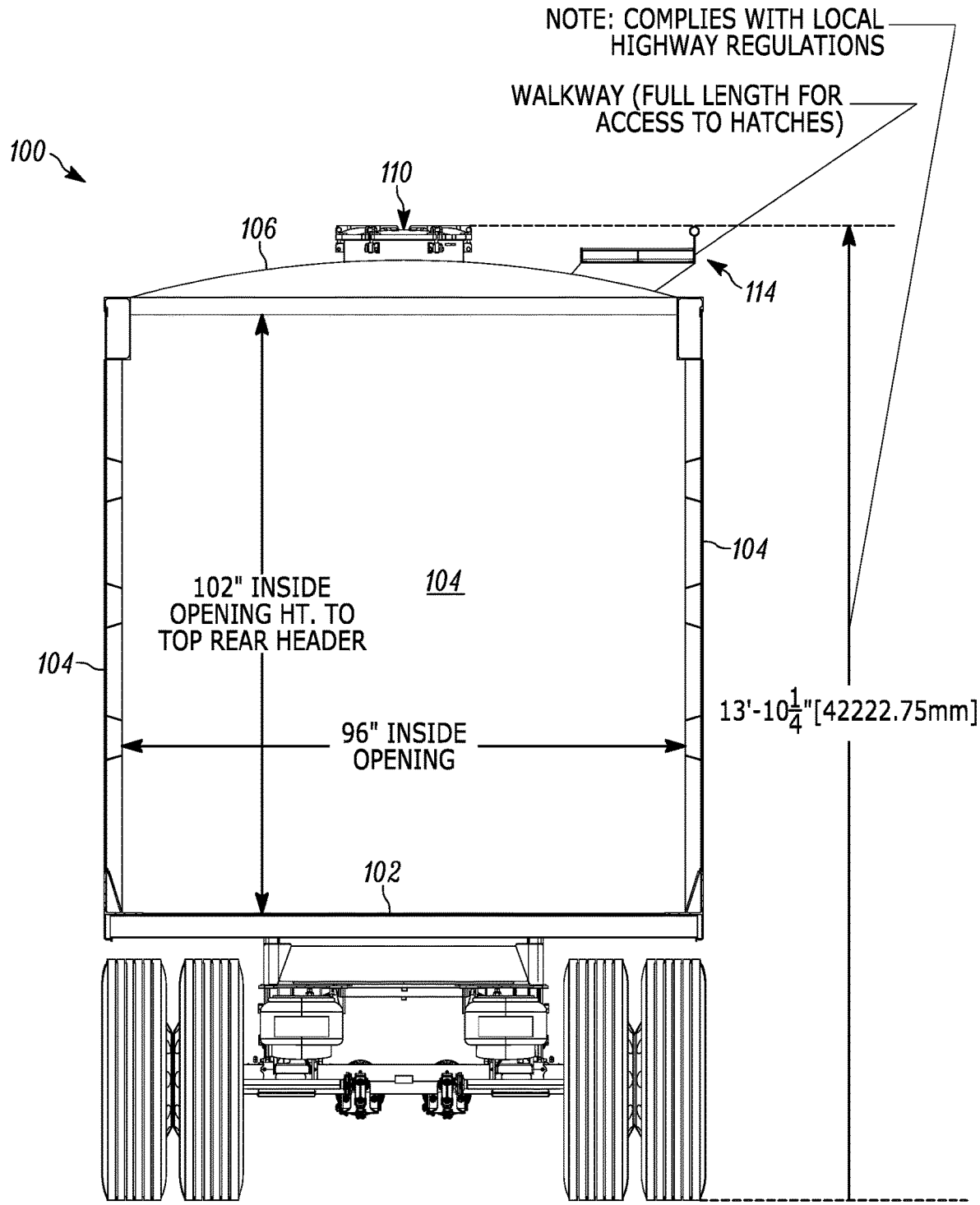
FIG. 3 illustrates a rear section view of the embodiment the convertible trailer of the present disclosure in FIG. 2.

FIG. 3 illustrates a section view of the embodiment the convertible trailer 100 of the present disclosure in FIG. 2, with certain internal structure removed for clarity (but will described later). As previously mentioned, one of skill in the art will recognize that the convertible trailer 100 of the present disclosure is preferably configured to have outside and inside dimensions that comply with applicable local rules and regulations and industry standards. An additional external difference may be a roof walkway 114 disposed adjacent the fill hatches 110, which is not found on a conventional over-the-road semi- or dry van trailer.

Figure 4:
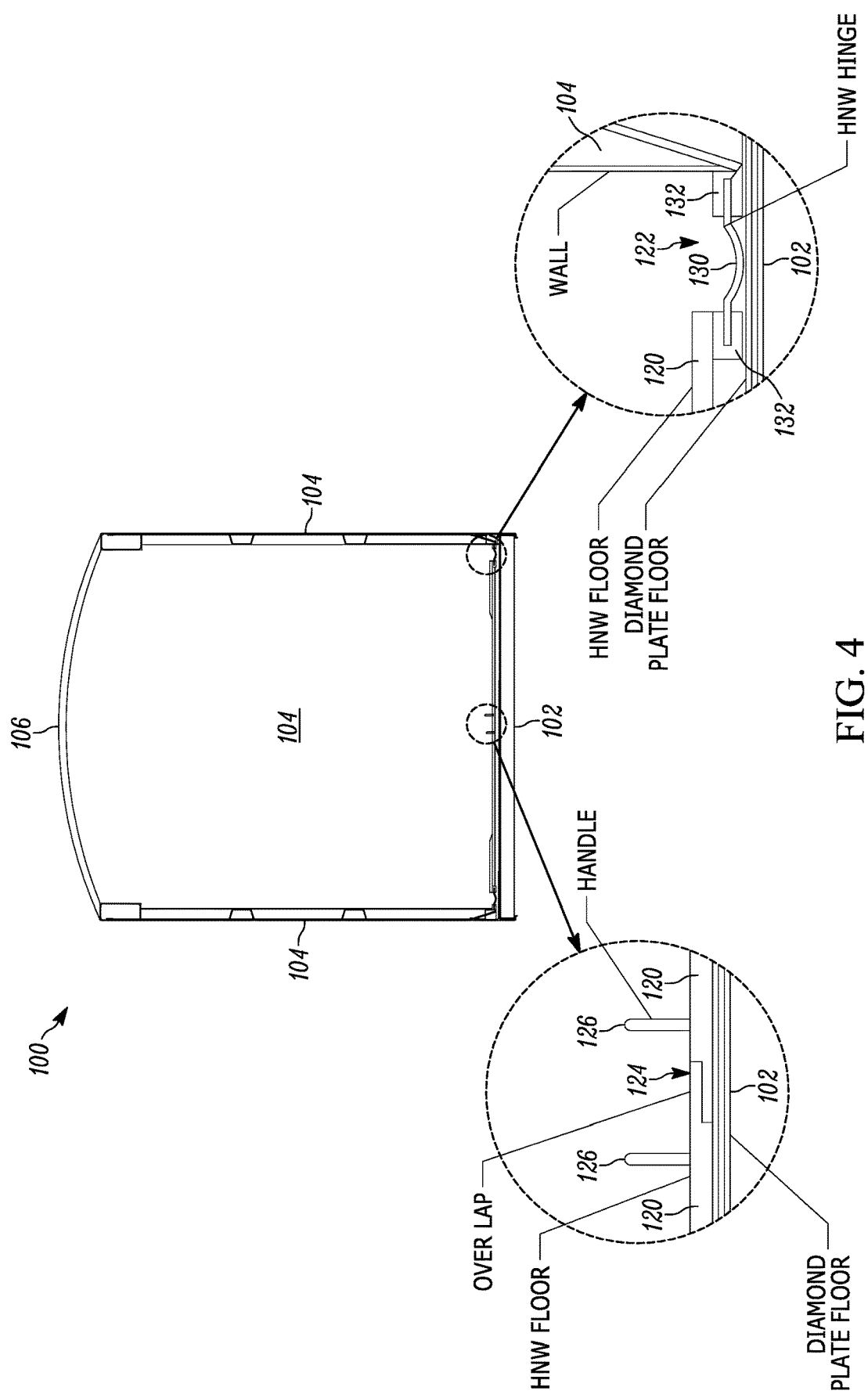
FIG. 4 illustrates an end elevation view of an embodiment the convertible trailer of the present disclosure with detail highlights of two aspects thereof.

FIG. 4 illustrates an end elevation view of an embodiment the convertible trailer 100 of the present disclosure, similar to FIG. 3 but with certain structural components removed for clarity, with detail highlights of two aspects thereof. As briefly described herein, the convertible trailer 100 of the present disclosure may be used in connection with the transport of dry bulk materials and packaged goods. In this embodiment, panels 120 (also identified by the reference HNW FLOOR, which are preferably made from ultra-high molecular weight polyethylene, commonly referred to as UHMW), are connected adjacent the intersection of each of the walls 104 and the floor 102 by a hinge 122, such as a living hinge, piano hinge or other suitable hinge or hinge-like structure, so that such panels 120 are movable between an up or stored configuration (not shown, where each panel 120 is substantially parallel to the respective wall 104 as would commonly be understood by one of skill in the art) and a down or in-use or operational configuration, where each panel 120 is substantially parallel to the floor 102, which may be constructed from aluminum plate or other suitable material, and there is an overlap 124 where the panels 120 meet substantially in the middle of the width of the floor 102. In this embodiment, a living hinge 122 is disclosed including a flexible middle portion 130 and a securing block 132 connected to each opposite end of the flexible middle portion 130. The securing blocks 132 are then connect to the floor and/or wall 104 and the panel 120 so that the only movable portion is the flexible middle portion 130. As a result, the trailer 100 of the present disclosure is convertible from an up or stored configuration, which facilitates conventional transport of packaged goods, including loading and unloading by fork lifts, hand trucks, etc., and a down or in-use or operational configuration, which facilitates transport of dry bulk material without a liner.

One of skill in the art will recognize that each panel 120 may extend the interior length of the trailer 100, but may also comprise multiple panels on each side of the trailer 100 so that an operator may more easily convert the trailer 100 between the up and down configurations. In a preferred embodiment, eight panels 120 may be used, four per side, and the adjacent panels 120 on each side also overlap in a similar manner as described herein. Conventional or custom-adapted hardware or structure may be used to secure the panels 120 to the walls 104 in the up or stored configuration.

A handle 126 may be disposed adjacent an inner edge of each panel near the overlap 124 and opposite the hinge to assist operator movement of the panel 120 between the up and down configurations. The handle 126 preferably folds flat to the floor 102 to avoid damage or may be formed as an aperture in the panel 120 in one embodiment. Preferably, the handle 126 may have any suitable construction as long as it provides the intended functionality.

The hinge 122 is preferable constructed of any acceptable material to facilitate the purpose of the convertible trailer. In one aspect the hinge provides a seal against the dry bulk material contacting the floor which may contaminate such dry bulk material. In one embodiment, the hinge may be constructed from UHMW or a similar material that provides the intended functionality. Likewise, the wall 104 may be constructed of a material or materials (such as, a composite construction of a plurality of materials) that facilitates the intended purpose of transport of dry bulk materials without adulteration or contamination.

Figure 5:
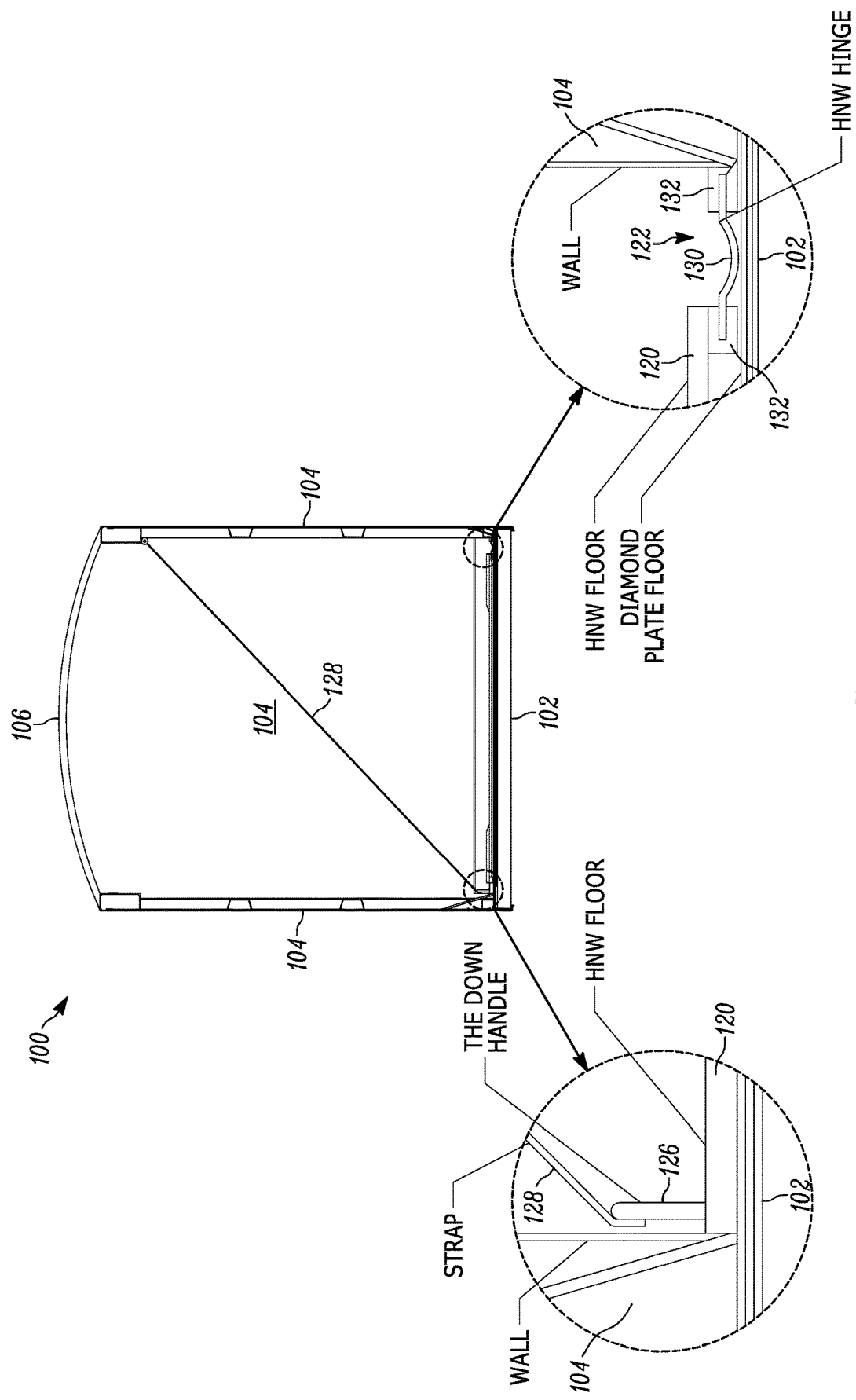
FIG. 5 illustrates an end elevation view of another embodiment the convertible trailer of the present disclosure with detail highlights of two aspects thereof.

FIG. 5 illustrates an end elevation view of another embodiment the convertible trailer 100 of the present disclosure, similar to FIG. 3 but with certain structural components removed for clarity, with detail highlights of two aspects thereof. This embodiment is similar to the embodiment described in FIG. 4 in intent and purpose, but some of the structure and functionality are slightly different. The hinge 122, wall 104, diamond plate floor 102, and handle 126 are structurally and functionally similar if not substantially identical, but the panel 120 has a different structure. In this embodiment, a single panel 120, rather than a pair of overlapping panels 120, is connected to one hinge 122 disposed adjacent to one of the walls 104 and a strap 128 is provided to facilitate movement of the panel 120 between the up configuration and the down configuration and securing the panel 120 in the up or stored configuration. One of skill in the art will recognize that the strap 128 is removable connected to the handle 126 such that it may be conveniently removed from the handle 126 when the panel 120 is disposed in the down or in-use or operational configuration. Again, the handle 126 preferably folds flat to the floor 102 to avoid damage or may be formed as an aperture in the panel 120 in one embodiment. Preferably, the handle 126 may have any suitable construction as long as it provides the intended functionality.

Figure 6:
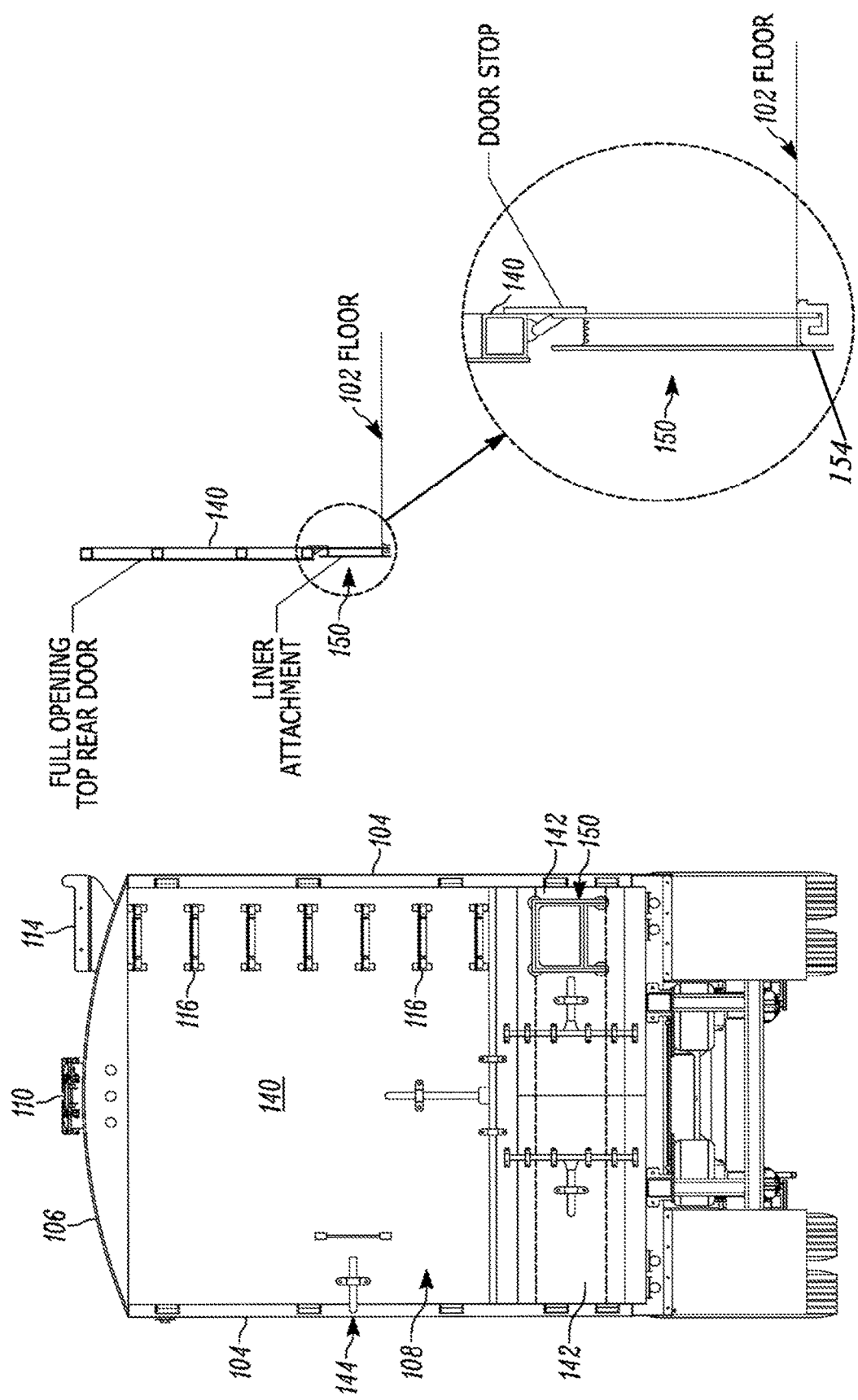
FIG. 6 illustrates an end elevation view of another embodiment the convertible trailer of the present disclosure with detail highlights of two aspects thereof.
Figure 7:
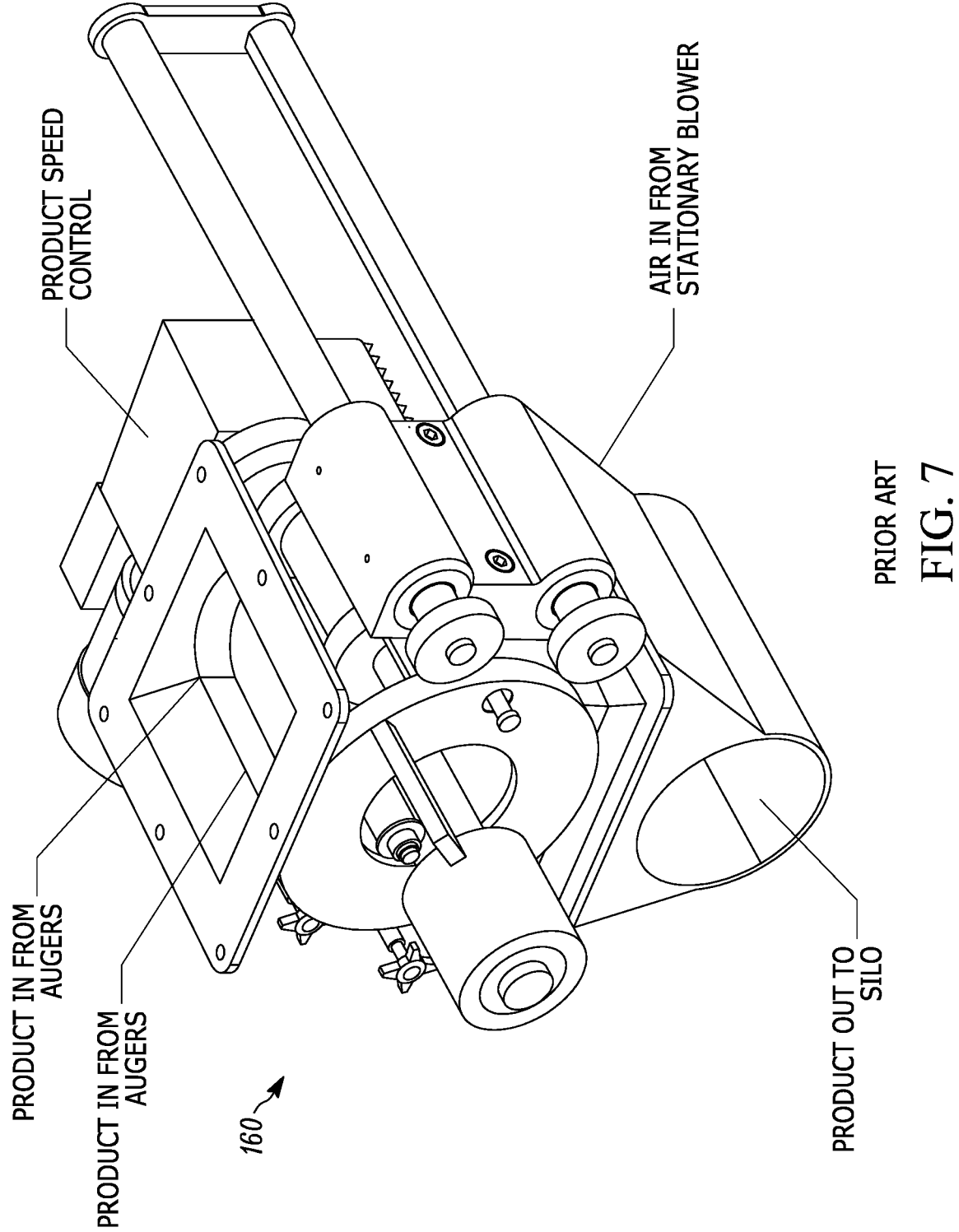
FIG. 7 illustrates a conveying device used in connection with the convertible trailer of the present disclosure.

FIG. 6 illustrates an end elevation view of another embodiment the convertible trailer 100 of the present disclosure with detail highlights of two aspects thereof. A plurality of steps, ladder rungs, etc. 116 are provided to enable operator access to the roof walkway 114. A door assembly 108 includes a main door portion 140 that is connected to one wall 104 and is movable pivotally from an open orientation (i.e., permitting access to the volume of the trailer 100) to a closed orientation (i.e., prohibiting access to the volume of the trailer 100) (as will be commonly understood by one of skill in the art), a pair of lower doors 142 that are pivotally connected to the adjacent wall 104 and to the main door portion 140 and floor 102 to secure the lower doors 142 in a closed orientation, and a discharge port 150 connected to the main door portion 140 behind one of the lower doors 142 (i.e., opening one of the lower doors 142 will expose the main door portion 140 behind such lower door 142 and the discharge port 150 as show in the left two detail drawing portions). As shown in FIG. 6, in one embodiment, the main door portion 140 is hinged on the right side and is secured to the opposite wall by a latch assembly 144. Each lower door 142 is pivotally connected to the adjacent wall 104 in order to open outwardly toward the respective wall 104 to which each is adjacently disposed. The discharge port 150 includes a slide gate that is movable up and down or side to side in order to reveal the potential opening afforded and defined by the discharge port 150, and a connection flange 154 that facilitates connection with a conveying device 160, such as, for example as shown in FIG. 7.

Figure 8:
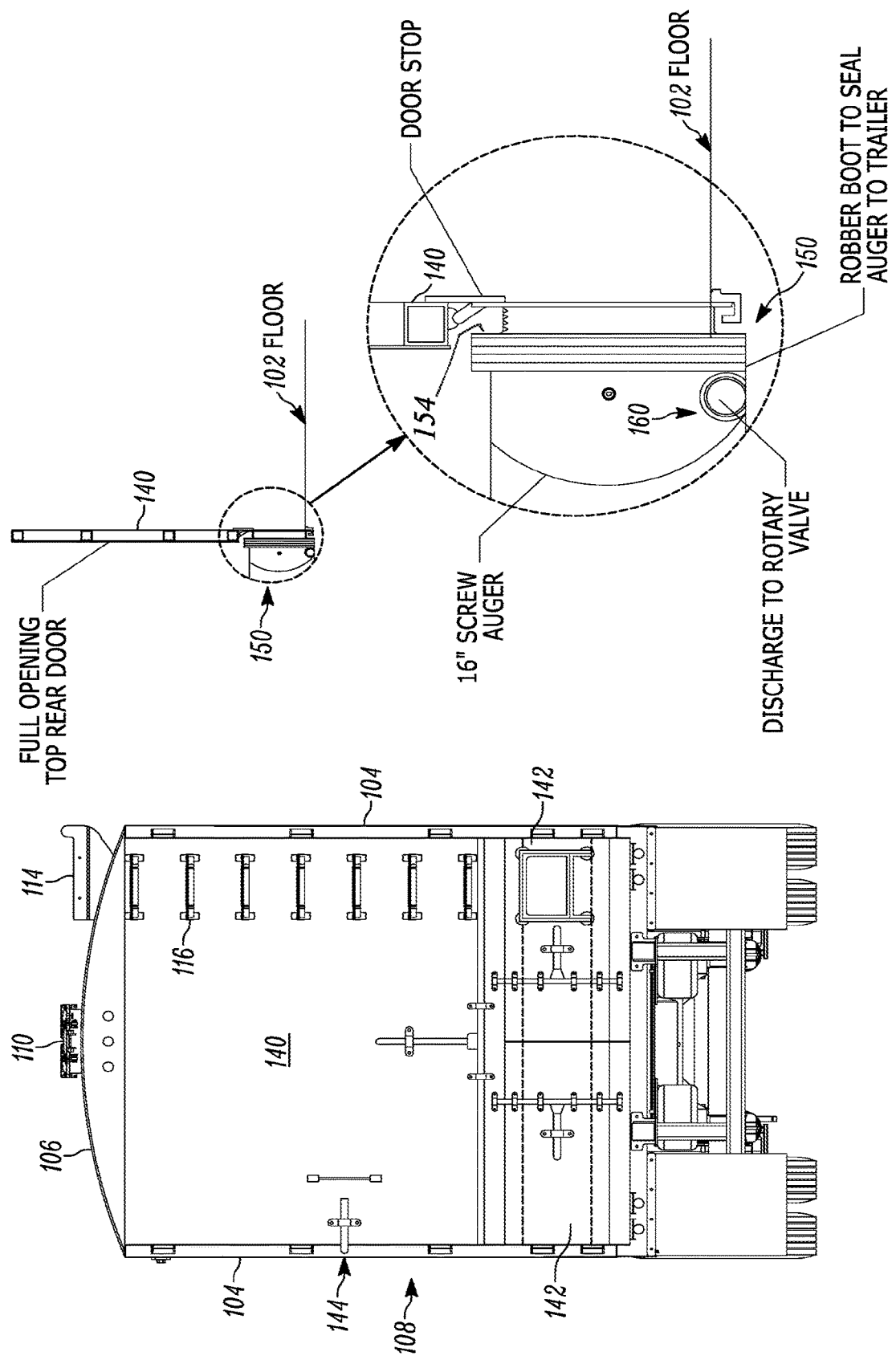
FIG. 8 illustrates an end elevation view of another embodiment the convertible trailer of the present disclosure with the conveying device attached thereto.

Preferably, the conveying device 160 is located at the delivery site and can be complementarily attached to the flange 154 (as shown in FIG. 8) such that there is little to no spillage or overflow of the dry bulk material during delivery. One of skill in the art will recognize and understand the conventional operation of a rotary feeder, auger and other conveying devices 160 for the intended functionality.

In operation, the convertible trailer 100 of the present disclosure may be easily converted from use as a packaged goods semi-trailer van to a trailer for the storage, transport and deliver of dry bulk materials. For example, preferably, the trailer 100 (in the up configuration for the transport of packaged goods) is cleaned and the panels 120 are lowered into position and secured in place for loading. In this down configuration (with the rear doors and gate or valve closed), the trailer 100 will be loaded through the top loading fill hatches 110 with the desired dry bulk material. After loading and securing all hatches 110 and doors 140, 142 on the trailer, the trailer 100 is delivered to the delivery point. Preferably, a tipper table 162, see FIG. 9, or a semi-mounted lift truck boom (i.e., lift truck, not shown), is available at the delivery site to facilitate unloading. The trailer 100 is then properly positioned depending on the local unloading facilities at the delivery point. In one embodiment, the trailer 100 is loaded onto the tipper table 162 and secured into position.

Then the lower doors 142 of the rear door assembly 108 may be opened. A conveying device 160, such as an auger or transfer pan adaptor can be mounted to the flange 154 in communication with the opening defined by discharge port 150. After the connection of the conveying device 160 is secured, the slide gate 152 can be opened to allow product to flow to the auger or transfer pan 160, thereby preventing spillage. See FIG. 8.

Figure 10:
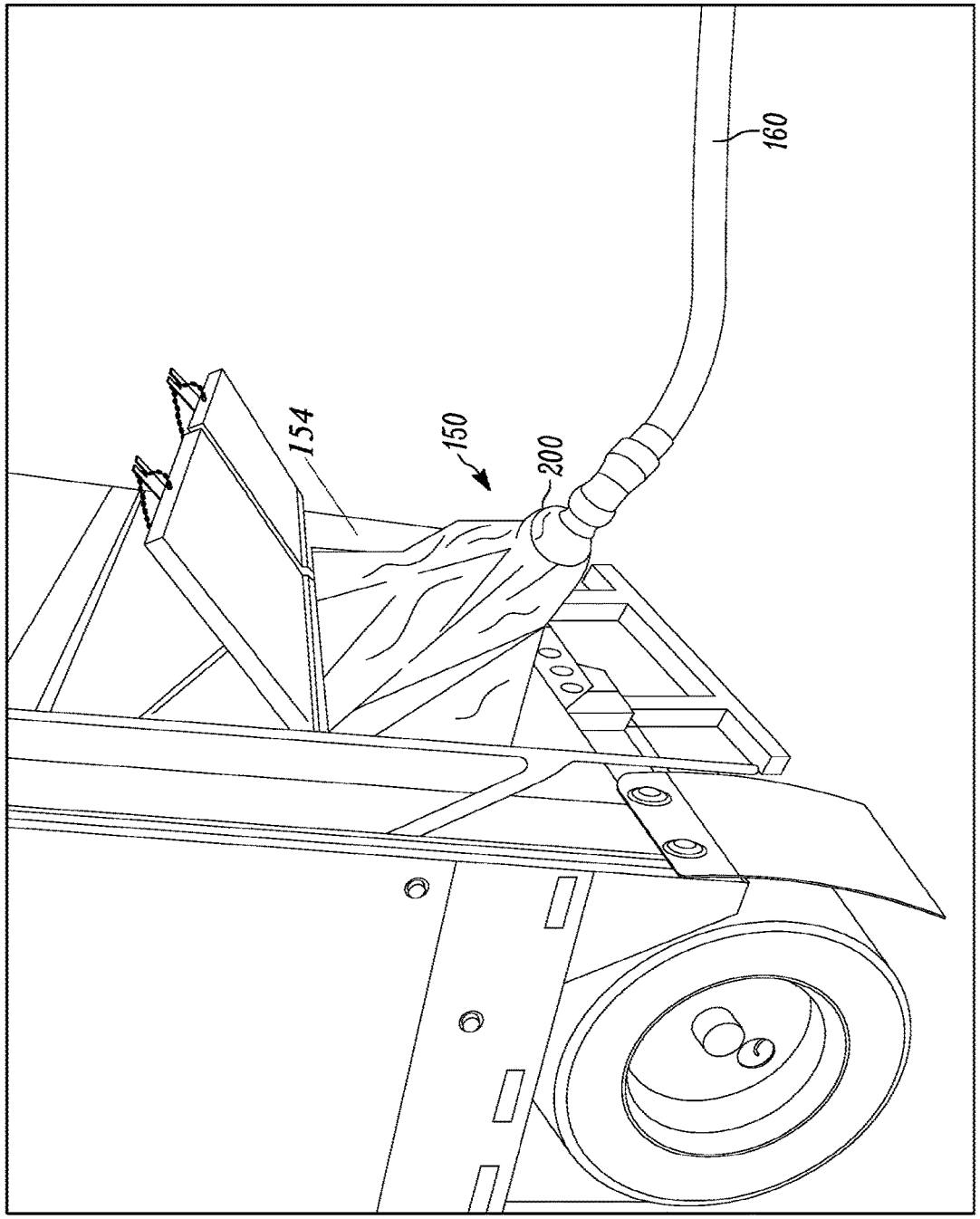
FIG. 10 illustrates one embodiment of a liner extending through a discharge port and connected to a conveying device.
Figure 11:
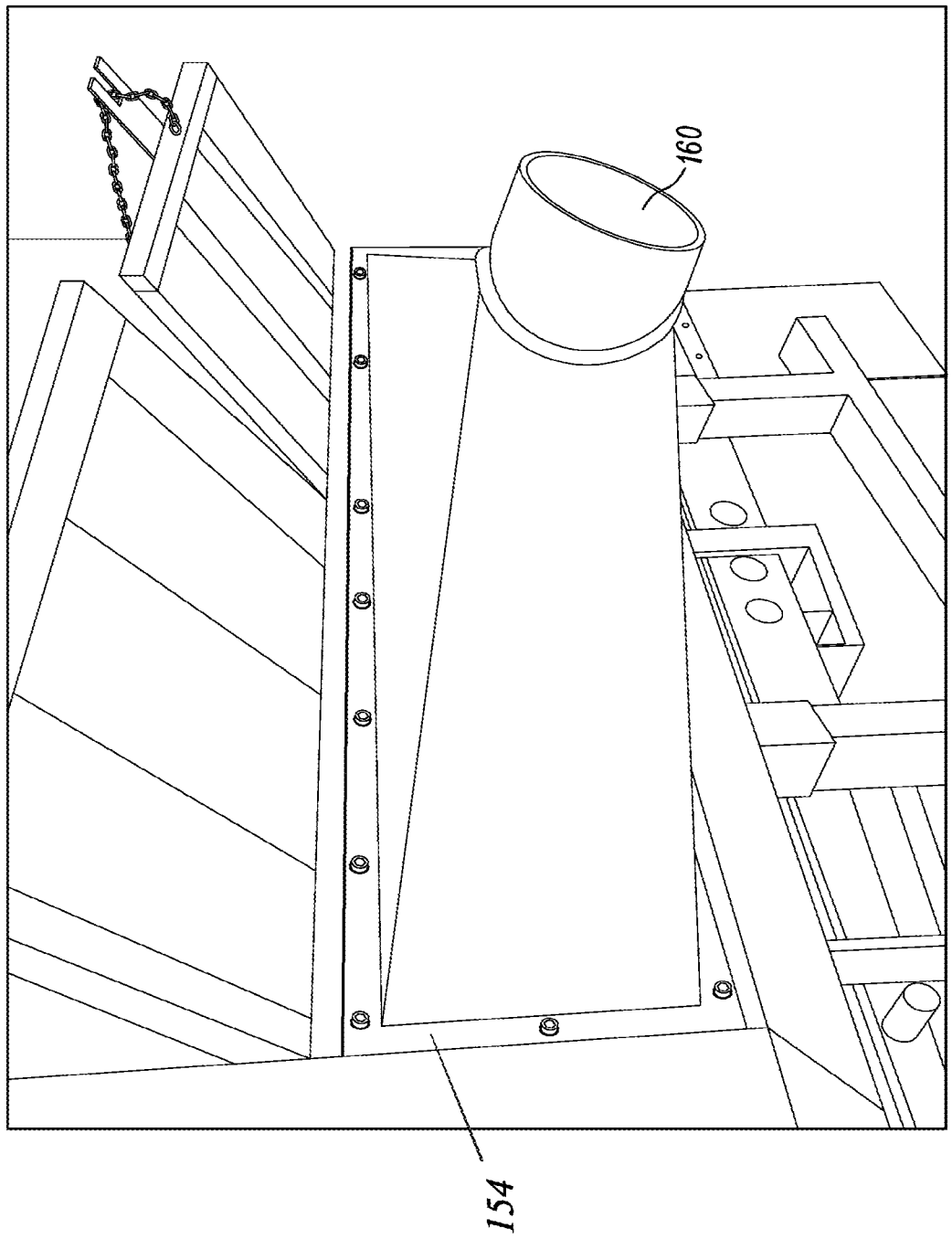
FIG. 11 illustrates one embodiment of a transfer pan connected to a discharge port.
Figure 12:
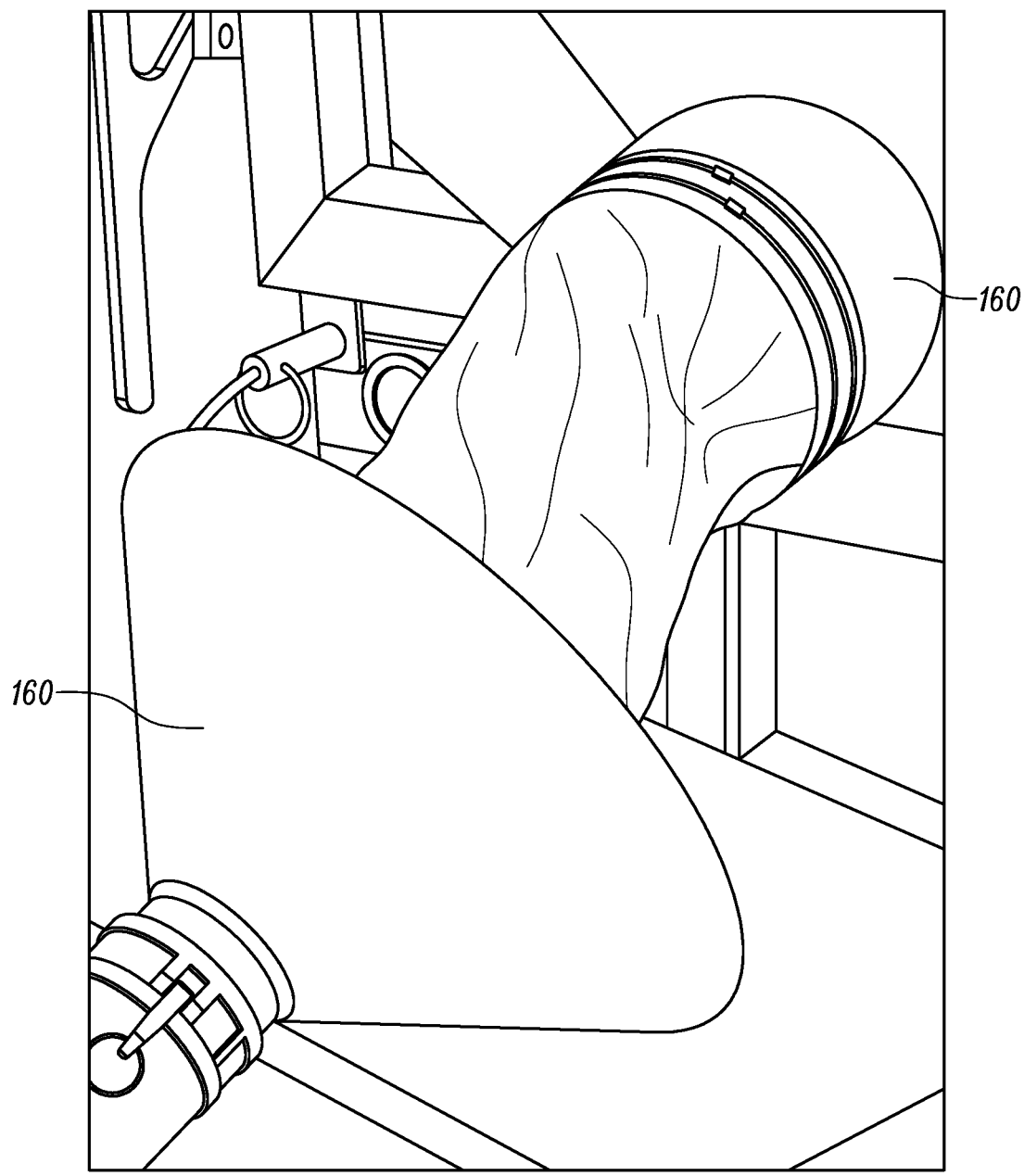
FIG. 12 illustrates the transfer pan connected to a conveying device.

In another embodiment, see FIGS. 10, 11, and 12, a liner 200 disposed within the volume of the trailer 100 includes dry bulk material disposed therein and to discharge the dry bulk material a connection between the liner and the conveying device 160 must be established. In this embodiment, the lower doors 142 may be moved or pivoted upward (i.e., hinged along their top edge to the main door portion) to define the discharge port 150 (the flange 154 is generally defined by the walls, floor and main door against which the lower doors 142 seal). A pocket formed in the liner may then be pulled from the trailer volume, through the opening defined by the flange 154 or the discharge port 150 and unzipped or cut open to make the connection, so that a hose that is a portion of the conveying device 160 or other suitable structure to provide the intended functionality may be coupled thereto. In order to avoid potential clogging issues as the trailer is tilted upward and the dry bulk material flows into the pocket of the liner, a transfer pan, see FIG. 11, may be connected to the flange 154 surrounding the opening or discharge port 150 defined by the opened lower doors 142. As shown in FIG. 12, the transfer pan 160 may be connected in a conventional manner to another conveying device 160 to move the dry bulk material to its intended location.

Figure 9:
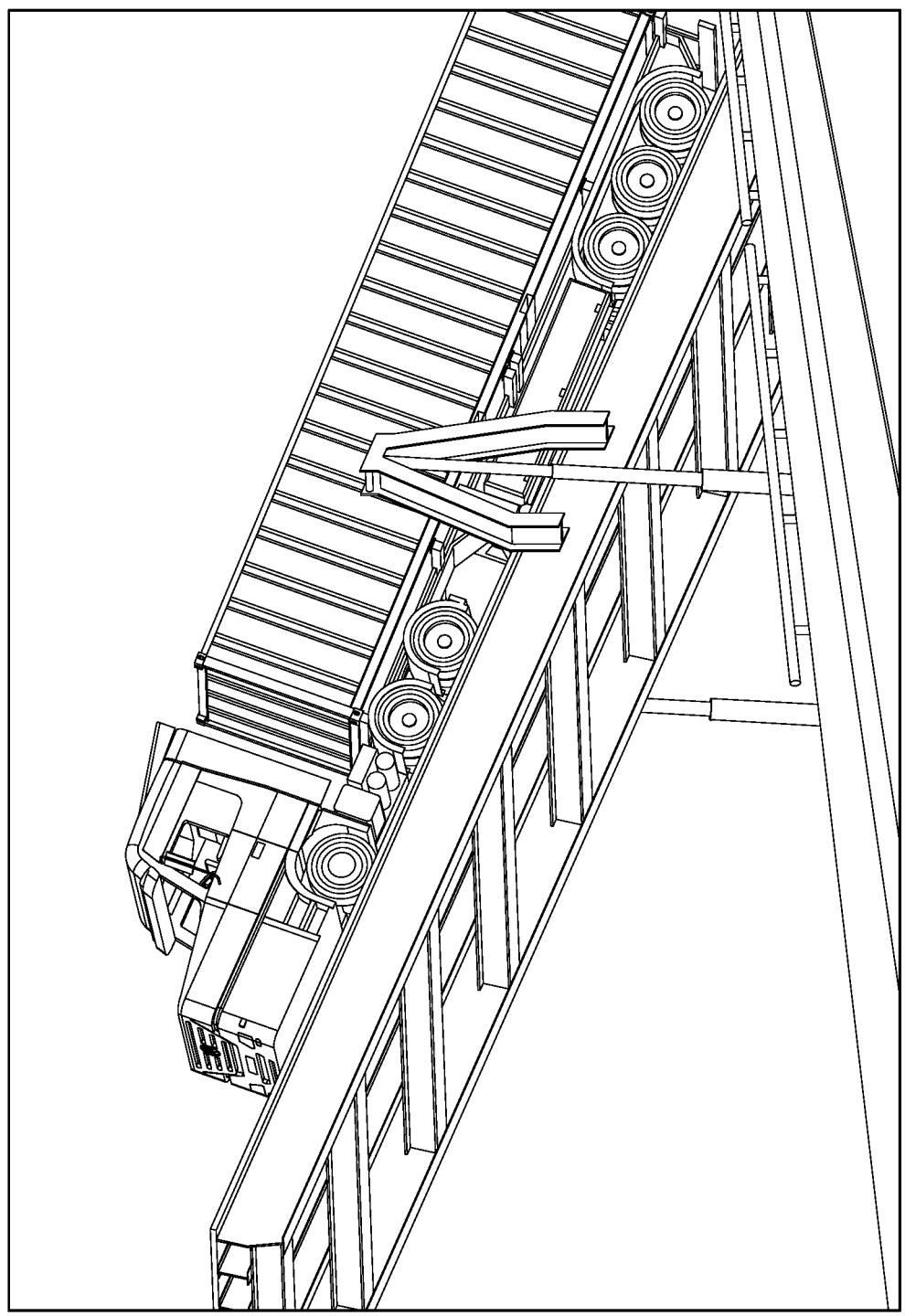
FIG. 9 illustrates a perspective view of the convertible trailer of the present disclosure disposed on a tipper table in an elevated orientation.

Then the trailer may be raised on the tipper table 162, as shown in FIG. 9, or a lift truck in order to facilitate complete delivery of all the dry bulk material in the trailer 100. As the trailer 100 (and tractor if applicable) is raised on the tipper table 162, the dry bulk material product will flow to the discharge port 150 to allow for steady product feed.

In one embodiment, a rotary feeder (as commonly understood) will blow the dry bulk material in to the silo, storage bin, etc. at the delivery location. Once the trailer 100 is empty, the trailer 100 will be lowered back to the starting position. The full door assembly 108 may then be opened up, and the interior of the trailer 100 vacuumed out and otherwise cleaned, and the floor panels 120 raised to the side walls 104 and secured into position in the up or stored configuration. Thereafter, the trailer 100 is now configured for packaged goods freight loading and delivery so as to efficiently backhaul.

In another embodiment, a method of delivering packaged goods and a dry bulk material without an empty backhaul may include configuring a convertible trailer assembly for one of the packaged goods and the dry bulk material at a first origin. The convertible trailer assembly may include any embodiment described herein, including a trailer including a volume defined by a floor, a plurality of walls, a door assembly and a roof and a panel movably connected to one of the floor and the one of the walls adjacent an intersection of the floor and the one of the walls, wherein the panel is movable between an up configuration substantially parallel to the adjacent wall to facilitate packaged goods loading and unloading and a down configuration substantially parallel to and covering the floor to facilitate dry bulk material loading and discharge. The first origin may include any point or geographic location where the convertible trailer assembly may be configured and loaded with one of the packaged goods and the dry bulk material as described herein.

The method may also include loading the one of the packaged goods and the dry bulk material in the configured convertible trailer assembly by the applicable manner as described herein, and delivering the configured convertible trailer assembly with the one of the packaged goods and the dry bulk material from the first origin to a first destination. One of skill in the art will recognize that the first destination is disposed at a geographic location that is different, separate, apart and/or remote from the first origin. At the first destination, the one of the packaged goods and the dry bulk material may be unloaded from the configured convertible trailer assembly.

The method may further include re-configuring the convertible trailer assembly for an other of the packaged goods and the dry bulk material at one of the first destination and a second origin, loading the other of the packaged goods and the dry bulk material in the re-configured convertible trailer assembly, and delivering the re-configured convertible trailer assembly with the other of the packaged goods and the dry bulk material from the second origin to a second destination. When at the second destination, the other of the packaged goods and the dry bulk material may be unloaded from the re-configured convertible trailer assembly as described herein.

The first destination and the second origin may be more closely disposed to one another than to the first origin or the second destination. In one embodiment, the first destination and the second origin are the same location. In a straight or direct backhaul, the first origin and the second destination are the same location.

The above detailed description and the examples described therein have been presented for the purposes of illustration and description only and not by limitation. It is therefore contemplated that the present disclosure cover any and all modifications, variations or equivalents that fall within the spirit and scope of the basic underlying principles disclosed above and claimed herein

The invention claimed is:

1. A method of delivering packaged goods and a dry bulk material, the method comprising:
 configuring a convertible trailer assembly for one: of the packaged goods, and the dry bulk material, at a first origin, wherein the trailer assembly comprises a trailer including a volume defined by a floor having a longitudinal axis, a plurality of walls extending parallel to the longitudinal axis and upwardly from opposite sides of the floor, a door assembly connected to the walls at an end of the floor that is disposed normal to the longitudinal axis, a roof connected to the walls opposite the floor and a panel pivotally connected to one of: the floor, and one wall of the plurality of walls, along and adjacent an intersection of the floor and the one wall of the plurality of walls, wherein the panel is movable between an up configuration, where the panel is disposed substantially parallel to the one wall of the plurality of walls to facilitate packaged goods loading and unloading on the floor, and a down configuration, where the panel is disposed substantially parallel to and covering the floor to facilitate dry bulk material loading and discharge;
 loading the one of the packaged goods and the dry bulk material in the configured convertible trailer assembly;
 delivering the configured convertible trailer assembly with the one of the packaged goods and the dry bulk material from the first origin to a first destination;
 unloading the one of the packaged goods and the dry bulk material from the configured convertible trailer assembly at the first destination;
 re-configuring the convertible trailer assembly for an other of the packaged goods and the dry bulk material at one of the first destination and a second origin;
 loading the other of the packaged goods and the dry bulk material in the re-configured convertible trailer assembly;
 delivering the re-configured convertible trailer assembly with the other of the packaged goods and the dry bulk material from the one of the first destination and the second origin to a second destination; and
 unloading the other of the packaged goods and the dry bulk material from the re-configured convertible trailer assembly at the second destination.

2. The method of claim 1, wherein the panel facilitates liner-less dry bulk material loading and discharge.

3. The method of claim 1, wherein the first destination and the second origin are more closely disposed to one another than to the first origin or the second destination.

4. The method of claim 1, wherein the first destination and the second origin are the same location.

5. The method of claim 1, wherein the first origin and the second destination are the same location.

* * * * *